US012769144B2

(12) United States Patent
Teng et al.

(10) Patent No.: US 12,769,144 B2
(45) Date of Patent: Oct. 20, 2026

(54) DISPLAY MODULE BASED ON DIVERGENT BEAMS WITH AN ASYMMETRICAL DIVERGENCE ANGLE

(71) Applicant: SUN YAT-SEN UNIVERSITY, Guangdong (CN)

(72) Inventors: Dongdong Teng, Guangdong (CN); Lilin Liu, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 185 days.

(21) Appl. No.: 18/592,550

(22) Filed: Mar. 1, 2024

(65) Prior Publication Data

US 2024/0295747 A1 Sep. 5, 2024

(30) Foreign Application Priority Data

Mar. 2, 2023 (CN) ........................ 202310201196.X
Jun. 21, 2023 (CN) ........................ 202310750454.X

(51) Int. Cl.
*G02B 27/22* (2018.01)
*G02B 30/33* (2020.01)

(52) U.S. Cl.
CPC .................................... *G02B 30/33* (2020.01)

(58) Field of Classification Search
CPC . G02B 30/33; G02B 27/0093; G02B 27/0172
See application file for complete search history.

(56) References Cited

U.S. PATENT DOCUMENTS 11,122,256 B1 * 9/2021 Topliss ............... G02B 27/0172
2019/0204600 A1 7/2019 Ha et al.

FOREIGN PATENT DOCUMENTS

| | | |
|---|---|---|
| CN | 109073904 | 12/2018 |
| CN | 112305776 | 2/2021 |
| CN | 113311581 | 8/2021 |
| CN | 113359312 | 9/2021 |
| WO | 2017186020 | 11/2017 |

OTHER PUBLICATIONS

"Office Action of China Counterpart Application, application No. 202310201196.X", issued on Jan. 27, 2026, p. 1-p. 9.
"Office Action of China Counterpart Application, application No. 202310201196.X", issued on Jun. 17, 2026, p. 1-p. 9.
"Office Action of China Counterpart Application, application No. 202310750454.X", issued on Jun. 26, 2026, p. 1-p. 7.

* cited by examiner

*Primary Examiner* — Euncha P Cherry
(74) *Attorney, Agent, or Firm* — JCIPRNET

(57) ABSTRACT

The present invention discloses a display module based on divergent beams with an asymmetrical divergence angle, which includes a light engine, a divergence-angle modulation element, a combiner, and a controller. The beams emitted from each projection point of the light engine are modulated, by the divergence-angle modulation element, into a bunch of beams with an asymmetrical divergence angle. Such a bunch of beams cover a rather large region on the combiner, by oblique incidence along one direction at a small divergence angle and by incidence along another direction at a large divergence angle. Then, the combiner converges incident beams from different projection points to corresponding viewing zones respectively, for a Maxwellian view 3D display or a Super multi-view 3D display.

31 Claims, 13 Drawing Sheets

DISPLAY MODULE BASED ON DIVERGENT BEAMS WITH AN ASYMMETRICAL DIVERGENCE ANGLE

CROSS-REFERENCE TO RELATED APPLICATION

This application claims the priority benefit of China application no. 202310201196.X, filed on Mar. 2, 2023 and China application no. 202310750454.X, filed on Jun. 21, 2023. The entirety of each of the above-mentioned patent applications is hereby incorporated by reference and made a part of this specification.

BACKGROUND

Technical Field

The present invention relates to the field of three-dimensional display technology, and more specifically to a display module based on divergent beams with an asymmetrical divergence angle.

Description of Related Art

Compared with traditional two-dimensional displays, three-dimensional (3D) displays are able to present the depth information, and are getting more and more attentions. Most existing 3D displays are based on stereoscopic technology, which present depth information per binocular parallax through projecting one corresponding perspective view to each eye of the viewer. In this process, the intersection of two eyes' visual directions triggers the viewer's sense of depth. But in order to see the corresponding perspective view clearly, each eye of the viewer has to focus on the display plane. Thus, an inconsistency between the binocular convergence depth and the monocular accommodation depth exits in the stereoscopic technology, which is often called the vergence-accommodation conflict (VAC). Under natural circumstances, when the viewer observes a real three-dimensional scene, the binocular convergence depth and the monocular accommodation depth are consistent. Thus, the vergence-accommodation conflict of the stereoscopic technology violates the human physiological habits and results in visual discomfort to the viewer.

Actually, vergence-accommodation conflict is the bottleneck problem that hinders the wide applications of 3D display technology. At present, researchers are trying to develop different technologies for alleviating or eventually overcoming this bottleneck problem. Among them, the Maxwellian view (for example, disclosed in US2019/0204600A1 with a title "AUGMENTED REALITY OPTICS SYSTEM WITH PINPOINT MIRROR") and the Super multi-view (for example, disclosed in WO/2017/186020A1 with a title "THREE-DIMENSIONAL DISPLAY SYSTEM BASED ON DIVISION MULTIPLEXING OF VIEWER'S ENTRANCE-PUPIL AND DISPLAY METHOD") are two feasible technologies. In the Maxwellian view technology, the light beam from each pixel has a small light-intensity gradient along the propagation direction for enhancing the attractiveness of the out-of-the-display-plane light spot to the viewer's focus. Then, driven by the binocular convergence, the eyes can focus at the binocular convergence depth within a certain depth range naturally. The latter technology projects two or more views to different segments of each pupil of the viewer. For a displayed spot, the two or more passing-through light beams from the two or more views along different directions superimpose into a spatial light spot. When the light intensity distribution at this spatial light spot enables stronger attraction to the eye's focus than that of the pixels on the display plane, the viewer's eye will focus on the superimposed spatial spot naturally, resulting in a consistency between the binocular convergence depth and the monocular accommodation depth.

SUMMARY

The present invention proposes a display module based on divergent beams with an asymmetrical divergence angle, to achieve a 3D display free from VAC conflict by a thin optical structure. The proposed display module can provide perspective views to two eyes of the viewer, or function as an eye-piece for one eye of the viewer, with two such eye-pieces constructing a binocular display apparatus. The display module includes a light engine, a divergence-angle modulation element, a combiner, and a controller. The beams emitted from each projection point of the light engine are modulated, by the divergence-angle modulation element, into a bunch of beams with an asymmetrical divergence angle. Such a bunch of beams cover a rather large region on the combiner, by oblique incidence along a direction at a small divergence angle and by incidence along another direction at a large divergence angle. The covering region on the combiner guarantees a reasonable field of view (FOV) of the projected image to the viewer. Then, the combiner converges incident beams from different projection points to corresponding viewing zones, respectively, implementing a Maxwellian view 3D display or a Super multi-view 3D display The invention provides a display module based on divergent beams with an asymmetrical divergence, comprising:

- a controller;
- a light engine configured to respectively project divergent beams from M projection points under control of the controller, wherein M≥1;
- a divergence-angle modulating element configured to modulate beams from a projection point, such that beams from the projection point are emit as a bundle of beams with an asymmetrical divergence angle, ≤10° along a lateral reference direction and >10° along a vertical reference line;
- a combiner configured to perceive the beams from the divergence-angle modulating element, with an obliquely incidence of the beams emitted by the projection point along a direction at the divergence angle ≤10°, and converge the beams from the projection point to a corresponding viewing zone.

Preferably, the divergence-angle modulating element is a cylindrical lens with a straight axis, or a cylindrical lens with a curved axis, or a combination of a collimating lens and a cylindrical lens, or a plane with micro-nano structure.

Preferably, the display module further comprises a deflecting unit locating in a light path of the beams from the projection points, a deflecting unit is used for assisting the combiner to direct beams from the projection point to different viewing zones by deflecting incident beams under control of the controller.

Preferably, the display module further comprises a pupil tracking unit which is configured to detect positions of a viewer's pupil(s) real-timely, and the controller synchronously activates the projection points based on the detection of pupil tracking unit such that the projection points emit beams that reach to the viewer's pupil(s).

Preferably, the display module further comprises a pupil tracking unit which is configured to detect positions of the viewer's pupils real-timely, and only viewing zones around the pupil(s) are generated under the control of the controller.

Preferably, the display module further comprises an auxiliary guiding element, for assisting to direct beams from the light engine to the combiner.

Preferably, the combiner comprises a wave-guide and a converging element, wherein the wave-guide guides beams from the projection point to the converging element and the converging element converges the beams from the projection point to corresponding viewing zone.

Preferably, the wave-guide comprises a wave-guide body, an entrance pupil, a coupling-in element, two reflecting surfaces, a coupling-out element, and an exit pupil;

wherein, passing through the divergence-angle modulating element, beams from a projection point enter the wave-guide body through the entrance pupil; then, guided by the coupling-in element and reflected by the reflecting surfaces, the beams from each projection point propagate in the wave-guide body toward the coupling-out element; the coupling-out element guides the light from each projection point to the converging element through the exit pupil.

Preferably, the coupling-out element is a metasurface structure, or a holographic grating structure, or a relief grating structure.

Preferably, the wave-guide further comprises a compensation unit placed between the coupling-out element and the external environment, for eliminating an impact of the coupling-out element and/or the converging element on the light from the external environment.

Preferably, the converging element is integrated within the wave-guide.

Preferably, the converging element is integrated within the coupling-out element.

Preferably, the combiner comprises a direction modulating element and a converging element, wherein the direction modulating element modulates beams from the projection point and guides the beams to the converging element, and the converging element converges the beams from the projection point to the corresponding viewing zone.

Preferably, the direction modulating element is a reflecting surface with a metasurface structure, or with a holographic grating structure, or with a relief grating structure.

Preferably, the combiner further comprises a compensation unit positioned between the direction modulating element and the external environment, for eliminating an impact of the direction modulating element and/or the converging element on the light from the external environment.

Preferably, the converging element is integrated within the direction modulating element.

Preferably, each beam from a projection point carries corresponding optical data under control of the controller, with the corresponding optical data of a beam being the projection information of a displayed 3D scene along the transmission direction that the beam reaches into corresponding viewing zone.

Preferably, the light engine comprises M beam scanning projectors having a signal connection with the controller, wherein, a beam scanning projector comprises a scanning element and a modulated-beam generating unit, wherein, beams from a modulated-beam generating unit are sequentially deflected by the scanning element to generate divergent beams under control of the controller, with the scanning element functioning as a projection point, and the modulated-beam generating unit refreshes each deflected beam synchronously with corresponding optical data under control of the controller.

Preferably, the light engine includes a display panel consisting of pixels or sub-pixels for loading optical data under control of the controller, an aperture array consisting of M apertures, and a first auxiliary modulating element guiding light from the display panel to the aperture array, wherein, light from a pixel or a sub-pixel and passing through an aperture functions as a beam, with corresponding optical data refreshed by the pixel or the sub-pixel under control of the controller, and with an aperture as a projection point.

Preferably, the light engine comprises an aperture array consisting of M apertures which function as M projection points, and a second auxiliary modulating element consisting of micro-nano units, and a display panel comprising pixels or sub-pixels for loading optical data under control of the controller, wherein, the micro-nano units of the second auxiliary modulating element are assigned to the pixels or sub-pixels of the display panel in a one-to-one manner, guiding beams from M pixel groups or M sub-pixel groups to the M apertures of the aperture array, respectively.

Preferably, the light engine comprises a light-source array consisting of M light sources, an imaging element which projects images of the light sources as M projection points, and a display panel comprising pixels or sub-pixels for loading optical data under control of the controller, wherein, the light sources provide backlights to the display panel, and the imaging element projects images of the light sources as M projection points.

Preferably, wherein the light engine comprises M projectors, wherein, each projector comprises a display panel, a filter aperture functioning as a projection point, and a first auxiliary modulating element guiding light from the display panel to the filter aperture, and wherein a display panel comprises pixels or sub-pixels for loading optical data under control of the controller.

Preferably, a backlit display screen is inserted into the light path of the beams emitting from the light engine, wherein, the backlit display screen comprises pixels or sub-pixels for loading optical data to incident beams from projection points under control of the controller, with the optical data of a beam being the projection information of a displayed 3D scene along the transmission direction that the beam reaches into the corresponding viewing zone.

Preferably, a backlit display screen is inserted into the light path of the beams emitting from the light engine, wherein, the backlit display screen comprises pixels or sub-pixels for loading optical data to incident beams from projection points under control of the controller, with the optical data of a beam being the projection information of a displayed 3D scene along the transmission direction that the beam reaches into the corresponding viewing zone.

Preferably, wherein a backlit display screen is inserted into the light path of the beams emitting from the light engine, wherein, the backlit display screen comprises pixels or sub-pixels for loading optical data to incident beams from projection points under control of the controller, with the optical data of a beam being the projection information of a displayed 3D scene along the transmission direction that the beam reaches into the corresponding viewing zone.

Preferably, the light engine comprises a backlight structure, and an aperture array consisting of M apertures which function as M projection points, wherein, the backlight structure provides backlight to the aperture array under control of the controller.

Preferably, the light engine is a light-source array consisting of M light sources which function as M projection points.

Preferably, the combiner is replaced by a combiner stack that comprises at least two combiners, with different combiners sharing a same divergence-angle modulation element, or different combiners corresponding to different divergence-angle modulation elements.

Preferably, the combiner is replaced by a combiner stack that comprises at least two combiners, with different combiners sharing a same divergence-angle modulation element, or different combiners corresponding to different divergence-angle modulation elements.

Preferably, the combiner is replaced by a combiner stack that comprises at least two combiners, with different combiners sharing a same divergence-angle modulation element, or different combiners corresponding to different divergence-angle modulation elements.

The details of the embodiments of the present invention are reflected in the accompanying drawings or the following description. The other features, objectives, and advantages of the present invention become more apparent through the following description and accompanying drawings.

BRIEF DESCRIPTION OF THE DRAWINGS

The attached drawings are used to help better understand the present invention and are also a part of this specification. These illustrated figures and descriptions of the embodiments are used together to illustrate the principles of the present invention.

DESCRIPTION OF THE EMBODIMENTS

Figure 1:
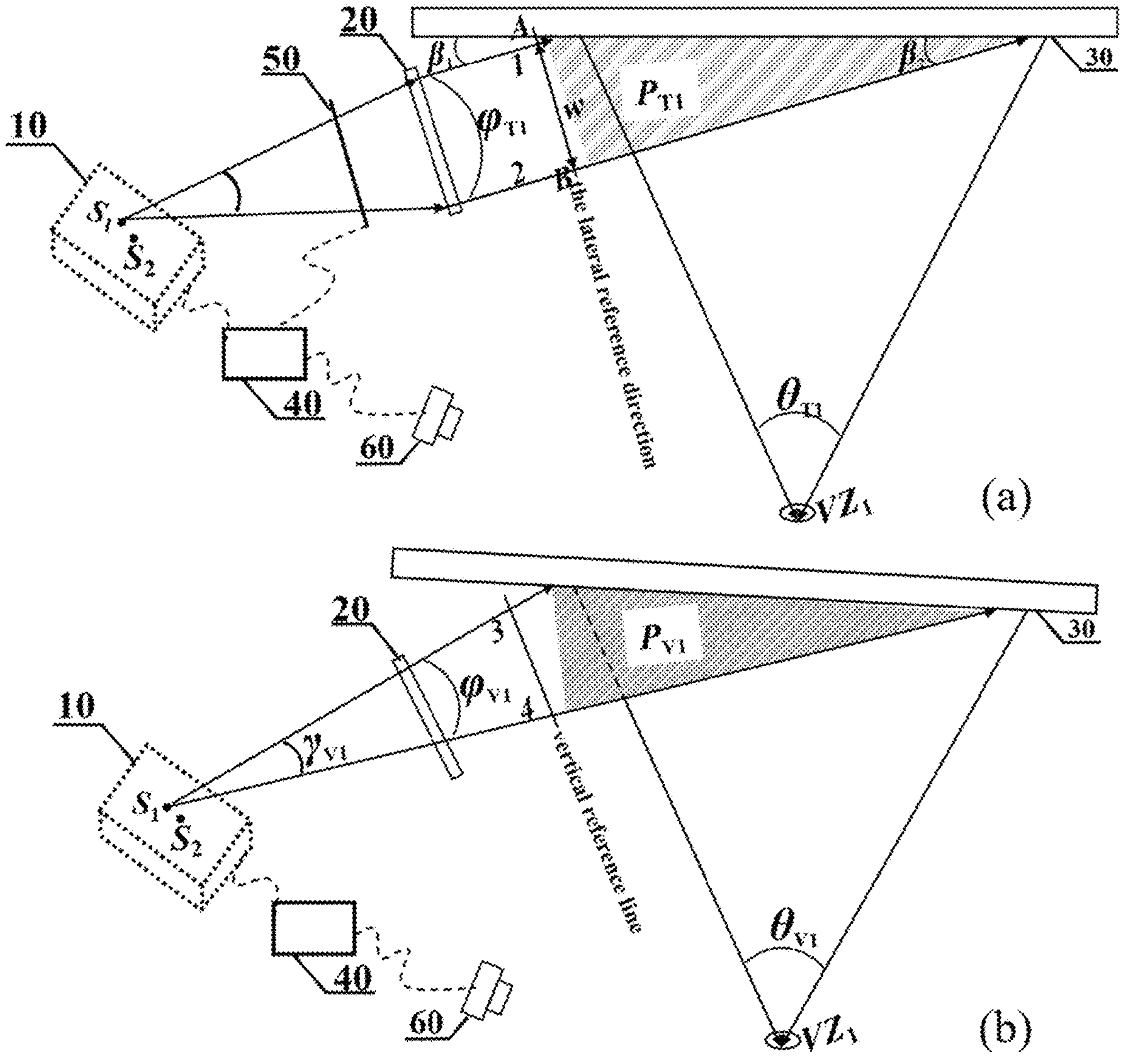
FIG. 1 is a structural schematic diagram of a display module of the present invention.

The drawings are only for illustrative purposes, and should not be construed as limitations on the present application. In order to better illustrate this embodiment, some components of the drawings may be omitted, enlarged or reduced, and do not represent the actual size of the product. As far as people are concerned, it is understandable that some well-known structures, repetitive structures in the drawings and related descriptions may be omitted. The invention discloses a thin-form-factor 3D display module, for implementing VAC-free Maxwellian view or Super multi-view display, with each bundle of beams projecting the image to corresponding viewing zone around the viewer's eye(s). Such a bundle of beams are with asymmetrical divergence, including a small divergence angle along the obliquely incident direction to the combiner and a large divergence angle along another direction. Two said display modules can function as two eye-pieces in a head-mounted 3D display system, such as in a head-mounted VR or AR. When the number of generated viewing zones is large enough for two eyes of a viewer, a said display module can work as a glasses-free binocular display apparatus. The technical solution of the present invention will be further described below with reference to the accompanying drawings and embodiments.

Embodiment 1

Figure 2:
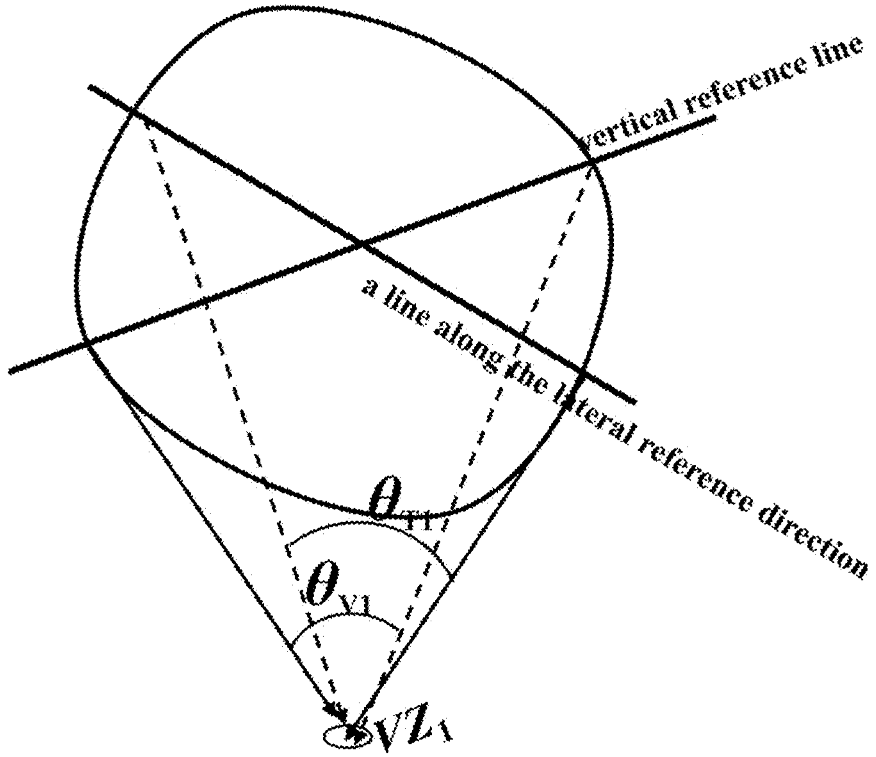
FIG. 2 schematically shows the covering region of the beams from a projection point on a plane facing to the corresponding viewing zone.

FIG. 1 shows a basic structure of the proposed display module. A light engine 10 projects a bundle of beams from each projection point. The light engine 10 is connected to the controller 40. Under control of the controller 40, different bundles of beams are projected from M≥1 projection points. For example, a FPG kit, or a computer, can function as the controller 40, with a signal connection with the light engine 10. The FPG kit, or a computer may also function as the controller 40 in the embodiments below (such as embodiment 2-5). FIG. 1 takes M=2 as example, with two projection points $S_1$ and $S_2$. Through a divergence-angle modulation element 20, beams from a projection point are transformed into a bundle of beams with an asymmetrical divergence angle. Beams from the projection point $S_1$, as an example, incident on a combiner 30 along an obliquely incident direction. In the plane containing the obliquely incident direction and the projection point $S_1$, the beams from the projection point $S_1$ cover a divergence angle $\varphi_{T1}$. It should be noted that, for convenience, we say these beams incident onto the combiner 30 obliquely along the lateral reference direction in this invention, although, in fact, they obliquely incident onto the combiner 30 along the plane containing the lateral reference direction as shown in (a) of FIG. 1. This is applicable to the following embodiments. Along a vertical reference line, which is often perpendicular or approximately perpendicular to the lateral reference direction, the beams from the projection point $S_1$ cover a divergence angle $\varphi_{V1}$, as shown in (b) of FIG. 1. In this invention, $\varphi_{T1} \leq 10°$ and $\varphi_{V1} > 10°$ are required. The plane containing a line along the lateral reference direction and the projection point $S_1$ is denoted as a plane $P_{T1}$. The beams, which are from a projection point and in a plane containing a line along the lateral reference direction, cover an enlarged region on the combiner 30 due to the oblique incidence, relative to the section size w of these beams. As in the exampled plane $P_{T1}$ of (a) of FIG. 1, the beams from the projection point $S_1$ are configured to obliquely incident onto the combiner 30 with a small inclination angle. Concretely, as shown in (a) of FIG. 1, the inclination angles $\beta_1$ and $\beta_2$ of the marginal beam 1 and another marginal beam 2 from the projection point $S_1$ both have rather small values. Under this condition, even with a small $\varphi_{T1}$ ($\leq 10°$), the beams from the projection point $S_1$ will cover an enlarged area of the combiner 30 in the plane $P_{T1}$, relative to the section size w of these beams. Along the vertical reference line shown in (b) of FIG. 1, a larger divergence angle $\varphi_{V1}$ ($>10°$) makes beams from the projection point $S_1$ to cover a rather large area on the divergence-angle modulation element 20, as shown in (b) of FIG. 1. The plane $P_{v1}$ contains the vertical reference line and the projection point $S_1$. In (a) of FIG. 1, $\varphi_{T1}$ takes a zero value when setting $\beta_1 = \beta_2$. $\varphi_{V1}$ is the included angle between marginal beams 3 and 4 (after passing through the divergence-angle modulating element 20) from the projection point $S_1$ in the plane $P_{V1}$. Here, $\varphi_{V1}$ can be equal to $\gamma_{v1}$, or also can be different with $\gamma_{v1}$. The value of $\varphi_{V1}$ is also set much greater than 10°, for example $\varphi_{V1} \geq 30°$. $\gamma_{v1}$ is the exit angle of the beams in the plane $P_{v1}$ when they emit from the projection point $S_1$. The combiner 30 modulates incident beams from the projection point $S_1$, and directs them to corresponding viewing zone $VZ_1$, as shown in FIG. 1. When the beams from the projection point $S_1$ enter into the viewing zone $VZ_1$, a perspective view with a FOV of $\theta_{V1}$ along a direction and a FOV of $\theta_{T1}$ along another direction gets projected to the viewing zone $VZ_1$. In FIG. 2, a closed curve schematically denotes the exiting region of the beams from the projection point $S_1$ on a plane facing to the viewing zone $VZ_1$. In this process, the beams emitting from a projection point is modulated, by the divergence-angle modulation element 20, into a bunch of beams with an asymmetrical divergence angle. This bunch of beams covers a region with a pursued size on the combiner 30, by an oblique incidence along a direction and by a large divergence angle along another direction.

Figure 3:
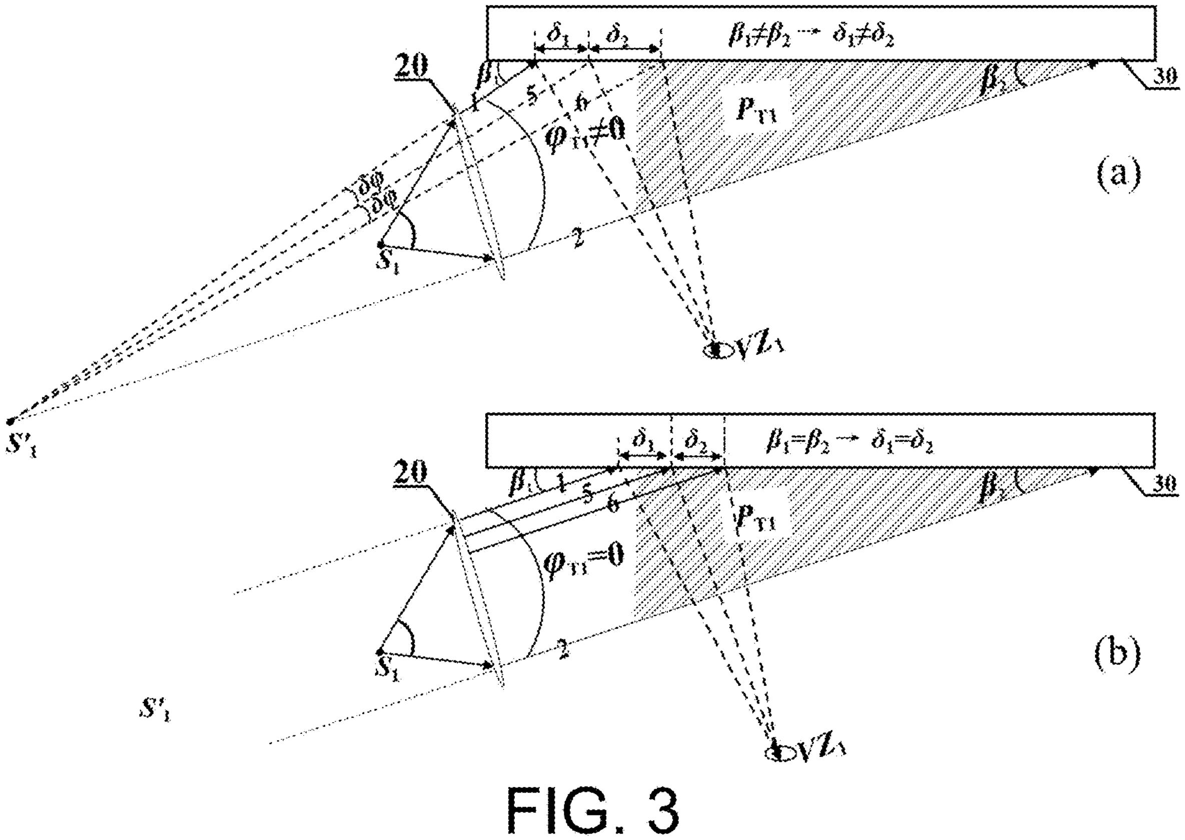
FIG. 3 shows the projection-point spacing on the combiner between adjacent beams from a projection point along the obliquely incident direction.

(a) of FIG. 1 is redrawn as FIG. 3 with some minor changes. Beams from projection point $S_1$ are taken as emitting from a virtual point $S'_1$ equivalently. With a non-zero $\varphi_{T1}$ shown in (a) of FIG. 3, due to oblique incidence of the beams to the combiner 30, adjacent beams with an equal angular spacing $\delta\varphi$ will generate different spacing values between their projection points on the combiner 30. Concretely, adjacent beams 1, 5, 6 shown in (a) of FIG. 3 correspond to unequal projection-point spacing values $\delta_1$ and $\delta_2$. A larger $\varphi_{T1}$ will produce a more obvious non-uniformity of projection-points along the obliquely incident direction. So, a small $\varphi_{T1}$ is beneficial for uniform projection-point spacings. As shown in (b) of FIG. 3, with $\varphi_{T1}=0$, adjacent beams 1, 5, 6 correspond to an equal projection-point spacing $\delta_1=\delta_2$. Under this condition, the corresponding equivalent point $S'_1$ is at an infinite distance. $\delta_1=\delta_2$ means a perspective view with a uniform resolution along the obliquely incident direction. So, the beams from a projection point are preferred to be designed with a small divergence angle along the obliquely incident direction when they propagate to the combiner 30. If the non-uniform problem of the projection-point spacing is within an acceptable range, the proposed display module can work under more relaxed conditions, for example, when $\varphi_{T1} \leq 20°$ and $\varphi_{V1} > 20°$, or even $\varphi_{T1} \leq 30°$ and $\varphi_{V1} > 30°$. Then, the combiner 30 converges incident beams from a projection point to corresponding viewing zone. Thus, the viewing zone $VZ_1$ will receive an image carried by the beams from the projection point $S_1$, which has a FOV depending on the coverage size on the combiner 30 by corresponding beams.

This process is applicable to all the projection points. Thus, when the light beams from each projection point are refreshed by a perspective view converging to corresponding viewing zone under control of the controller 40, M perspective views will be projected to M viewing zones, respectively. When the interval between adjacent viewing zones is small enough, a pupil around the viewing zones will perceive at least two 2D images of the displayed 3D scene, implementing a Super multi-view display. When only one complete 2D image of displayed 3D scene is received by a pupil, a Maxwellian view display can get implemented. Two proposed display modules can function as two eye-pieces in a 3D display system, such as in a head-mounted VR or AR. When the number of generated viewing zones is large enough for two eyes of a viewer, said display module can work as a glasses-free binocular display apparatus.

In the proposed display module, a deflecting unit 50 can be inserted into the light path of the beams, as shown in (a) of FIG. 1. Through deflecting incident beams under control of the controller 40, the beams from a projection point can be directed to different viewing zones. So, based on time-multiplexing, more viewing zones can get generated by the deflecting unit 50. In (a) of FIG. 1, the deflecting unit 50 is placed between the light engine 10 and the divergence-angle modulating element 20. It can also be inserted between the divergence-angle modulating element 20 and the combiner 30, or between the combiner 30 and the viewing zones, or between different components of the combiner 30 when the combiner 30 is constructed by multiple components.

Figure 4:
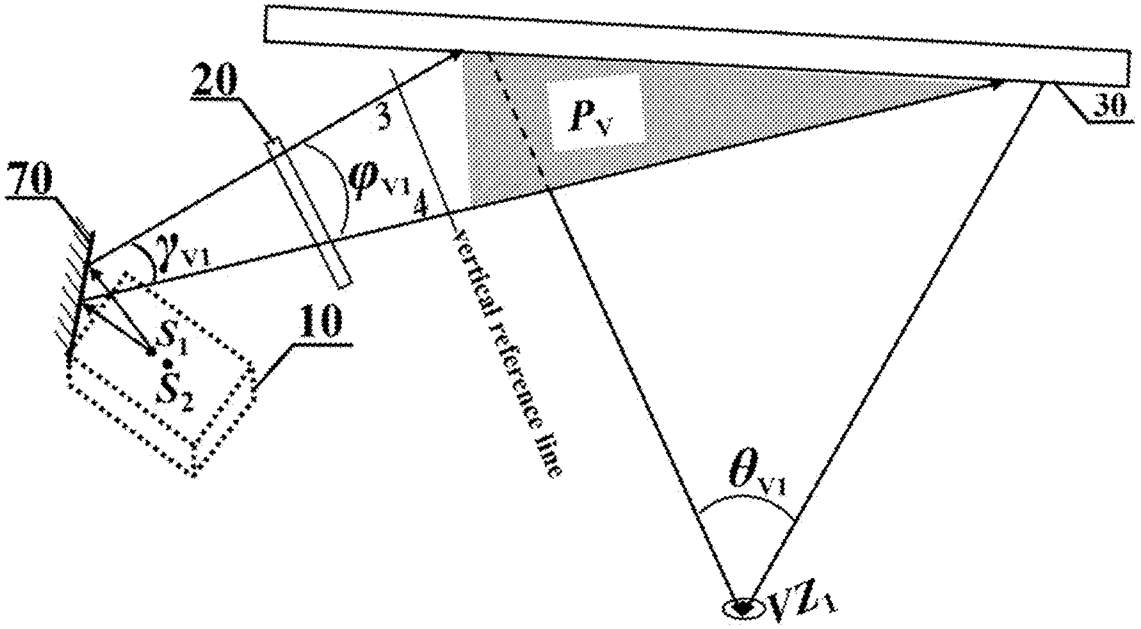
FIG. 4 shows a display module with an auxiliary guiding element.

Furthermore, the display module can employ a pupil tracking unit 60, for detecting the real-time position of the viewer's pupil(s). The pupil tracking unit 60 have a signal connection with the controller 40. Under this condition, only the viewing zones around the pupil(s) are generated under the control of the controller 40, decreasing the number of necessarily generated viewing zones effectively. That is to say, the viewing zones whose passing-through beams miss the pupil are no need to be generated under control of the controller. The pupil tracking unit 60 can play function whatever employing a deflecting unit 50 or not. An auxiliary guiding element 70 can also be inserted into the display module, to change the propagation path of the beams, as the exampled mirror in FIG. 4. The auxiliary guiding element 70 may be other optical elements, such as a prism, or a biplane mirror, and so on.

Figure 5:
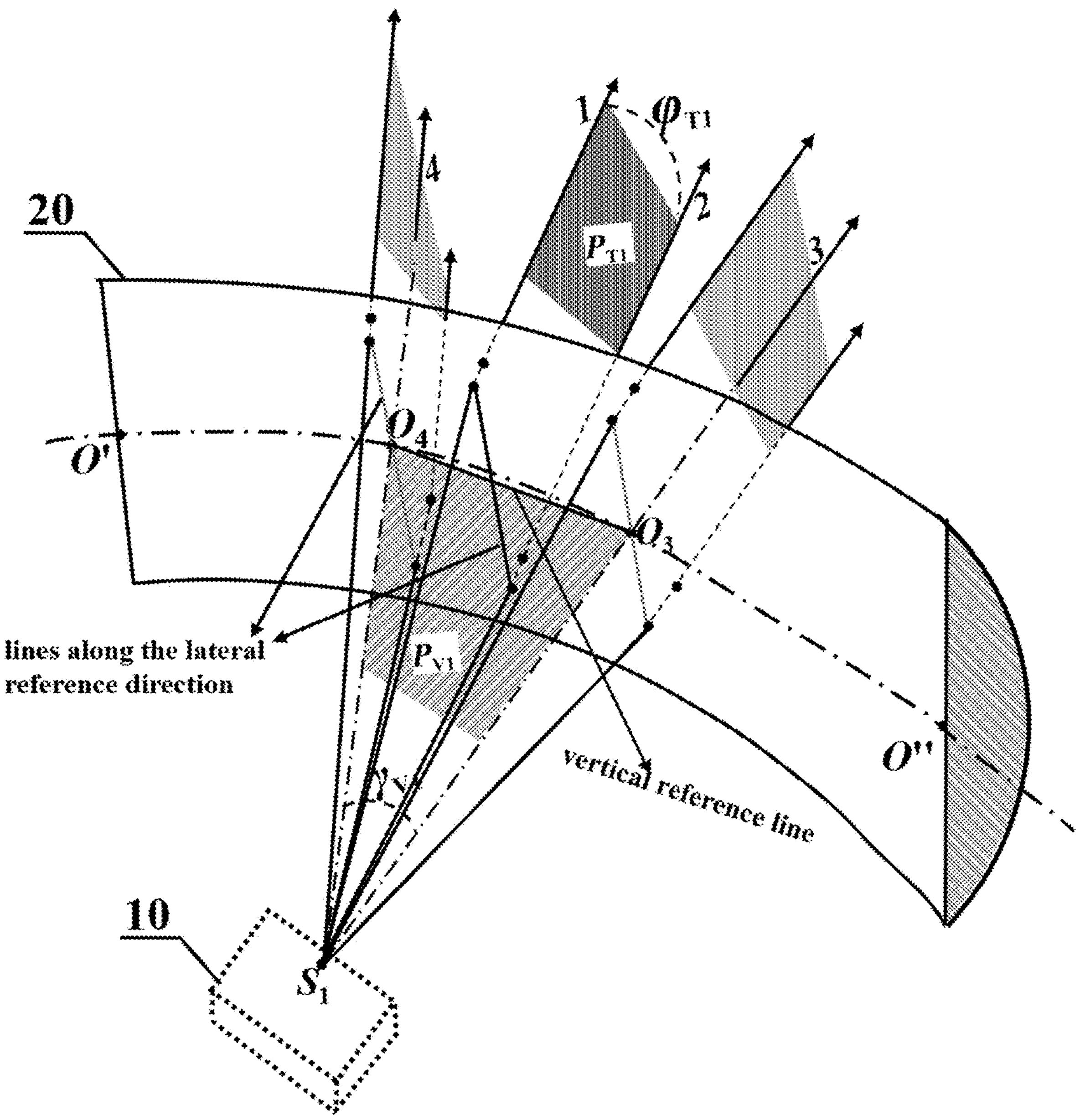
FIG. 5 shows an example of divergence-angle modulating element.
Figure 6:
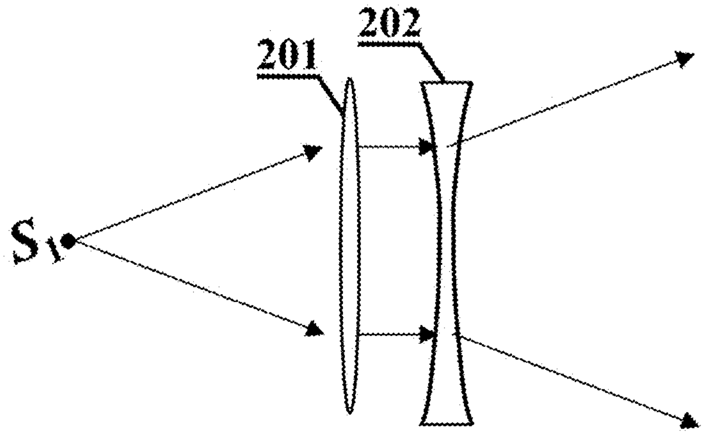
FIG. 6 shows another example of divergence-angle modulating element.

FIG. 5 shows a divergence-angle modulating element 20, which is a cylindrical lens with a curved axis O'O". A line $O_3O_4$ is taken as the vertical reference line, where points $O_3$ and $O_4$ are points on the curved axis O'O". Plane $P_{V1}$ contains the line $O_3O_4$ and the projection point $S_1$. Obviously, there is a plane $P_{Vn}$ (not shown) containing the line $O_3O_4$ and the projection point $S_n$ (not shown) for a projection point $S_n$. The plane $P_{Vn}$ may coincident with, or not coincident with the plane $P_{V1}$. The marginal beams 3 and 4 in the plane $P_{V1}$ pass through points $O_3$ and $O_4$, respectively. The direction perpendicular to the vertical reference line is taken as the lateral reference direction. The lateral reference direction is often set perpendicular to the vertical reference line, but not mandatory. The shown plane $P_{T1}$ contains a line along the lateral reference direction and the projection point $S_1$. For other beams from the projection point $S_1$, there exists other plane similar to the plane $P_{T1}$, such as the shaded planes containing beam 3 and beam 4 in FIG. 4. Each of such planes contains the point $S_1$ and a line along the lateral reference direction. In each of such planes, beams from the projection point $S_1$ obliquely incident onto the combiner with a divergence angle ≤10°. Different such planes may correspond to different divergence-angles. This applies to all projection points. In FIG. 5, the divergence angle $\varphi_{V1}$ is not shown, which is set equal to the exit angle $\gamma_{V1}$. FIG. 6 shows another example of the divergence-angle modulating element 20, which includes a collimating lens 201 and a cylindrical lens 202. The collimating lens 201 transforms the beams from a projection point $S_1$ into a parallel state. Or in other embodiments, of course, the collimating lens 201 also can transform the beams from a projection point $S_1$ into a bundle of beams with a small divergence angle. Other optical element (such as a cylindrical lens with a straight axis, or a micro-nano structure, et. al.) also may be taken as divergence-angle modulating element 20.

Embodiment 2

Figure 7:
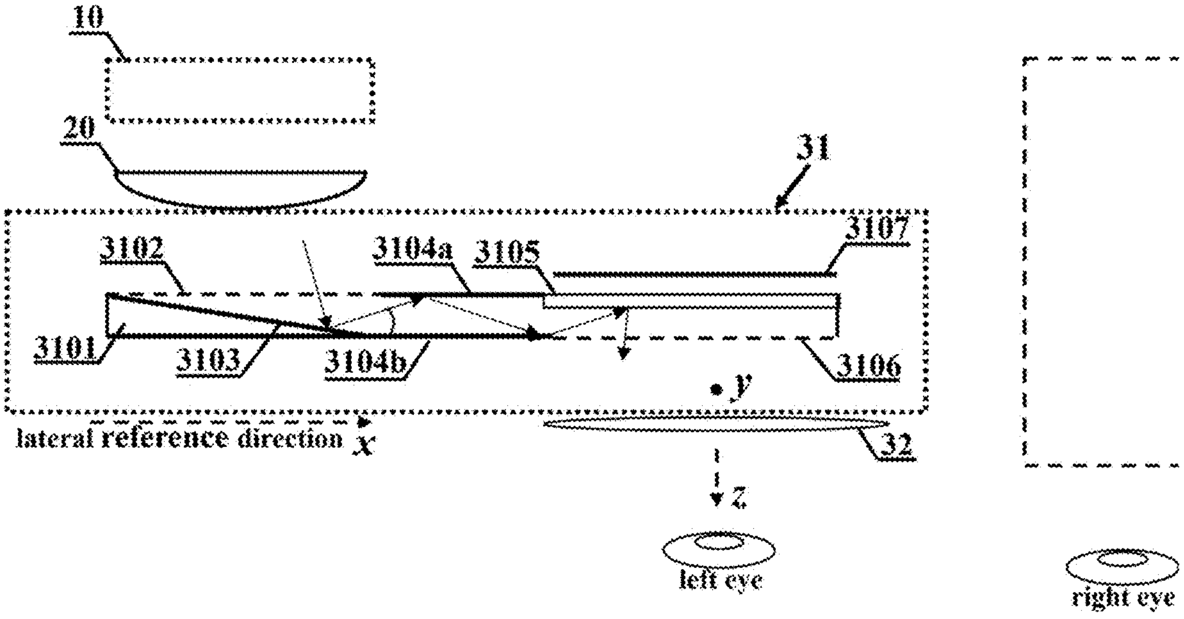
FIG. 7 shows the structural schematic diagram of a display module taking a wave-guide and a converging element as the combiner.

In FIG. 7, the combination of a wave-guide 31 and a converging element 32 are taken as a combiner 30. The wave-guide 31 includes a wave-guide body 3101, an entrance pupil 3102, a coupling-in element 3103, reflective surfaces 3104*a* and 3104*b*, a coupling-out element 3105, and an exit pupil 3106. The beams from a projection point are converted into a bundle of beams with an asymmetrical divergence angle. This bundle of beams has a divergence angle ≤10° along a lateral reference direction, and has a divergence angle >10° along a vertical reference line. The premise of the lateral reference direction setting is to guarantee that, the beams in a plane containing a line along the lateral reference direction obliquely incident into the wave-guide 31, to cover an enlarged region relative to section size w of these beams. In general, the beams from the light engine 10 are projected from a side position of the viewer along a line connecting two eyes of the viewer, especially when two proposed display modules are attached to two eyes of the viewer in a head-mounted display. As shown in FIG. 7, the beams incident obliquely to the wave-guide 31 along a plane containing the x-direction. In FIG. 7, the x-direction is taken as the lateral reference direction. In FIG. 7, only a display module for the left eye is shown, the display module for the right eye, which is similar to that for the left eye, is not shown for clarity. The light engine 10 and divergence-angle modulating element 20 may also be positioned at the other side of the wave-guide. The vertical reference line is often preferred to be perpendicular or nearly perpendicular to the lateral reference direction. Concretely, in FIG. 7, the vertical reference line is set along the y-direction, which is perpendicular to the lateral reference direction. The z-direction is perpendicular to the xy plane.

Then, a bundle of beams with an asymmetrical divergence angle from a projection point will incident onto the coupling-in element 3103 through the entrance pupil 3102. The coupling-in element 3103 guides these beams to propagate within the wave-guide body 3101 to the coupling-out element 3105, by the reflection of the reflective surfaces 3104*a* and 3104*b*. The coupling-out element 3105 modulates the obliquely incident beams from the projection point and guides them to the converging element 32 through the exit pupil 3106. The coupling-out element 3105 may be a metasurface structure, or a holographic grating structure, or a relief grating structure, and so on. Frequently, coupling-out element 3105 transforms the incident beams from a projection point into a bundle of parallel beams. The converging element 32, which is exampled as a lens in FIG. 7, converges the beams from a projection point to corresponding viewing zone. The wave-guide 31 can further comprise a compensation unit 3107, placed between the coupling-out element 3105 and the external environment in FIG. 7, for eliminating the impact of the coupling-out element 3105 and/or converging element 32 on the light from the external environment for a AR display. When the converging element 32 is integrated within the coupling-out element 3105 and the coupling-out element 3105 has no impact on the light from the external environment, a compensation unit 3107 is not needed for an AR display.

In the xy plane shown in FIG. 7, the beams from a projection point have a divergence angle ≤10°. Concretely, a divergence angle=0° is exampled in FIG. 8. That is to say, the beams in the xy plane are in parallel state. Under this condition, these beams cover a region $D_c$=w/sin(β) on the reflective surfaces 3104*a* along the x-direction. "w" is the section size of these beams, and β is the inclination angle of these beams. Obviously, with a smaller β, a larger $D_c$ will bring a larger FOV, such as the FOV of $\theta_{T1}$ shown in FIG. 1. A beam incident onto the combiner 30 only once is preferred by a noise-free display. When a beam incidents onto the coupling-out element 3105 more than once, the display module should be designed that at most only one of the coupled-out beams (no matter which one it is) from this incident beam can be received by the viewer. For a beam, the beam 2 shown in (a) of FIG. 8 as example, the interval between adjacent reflecting points at a reflective surface along the x-direction is $D_s$=2dcot(β), where d is the thickness of the wave-guide body 3101. This demands that $D_c \leq D_s$. Changing the value of (a) of FIG. 8's "w" to that of (b) of FIG. 8's "w" is preferred, resulting in $D_c = D_s$, which means that the beams from a projection point can just cover the reflective surfaces 3104*a* seamlessly, also without overlapping. Actually, light beams from other projection points will incident with an inclination angle different to the β of FIG. 8. Under this condition, the common region covered by beams from different projection points determines the final FOV of the displayed scene. Actually, with different inclination angle, for example an inclination angle <β, that "the beams from a projection point can just cover the reflective surfaces 3104*a* seamlessly" can be guaranteed by a smaller "w" shown in (b) of FIG. 8. The case that "the beams from a projection point can just cover the reflective surfaces 3104*a* seamlessly", shown in (b) of FIG. 8, has another advantage that, even position of the coupling-out element 3105 changes, all the beams from the projection point can be directed to corresponding viewing zone properly in this plane.

Along the vertical reference line, covering a large region on the combiner 30 by the beams from a projection point, corresponding to a large FOV along this direction, depends on the divergence angle >10°.

Figure 8:
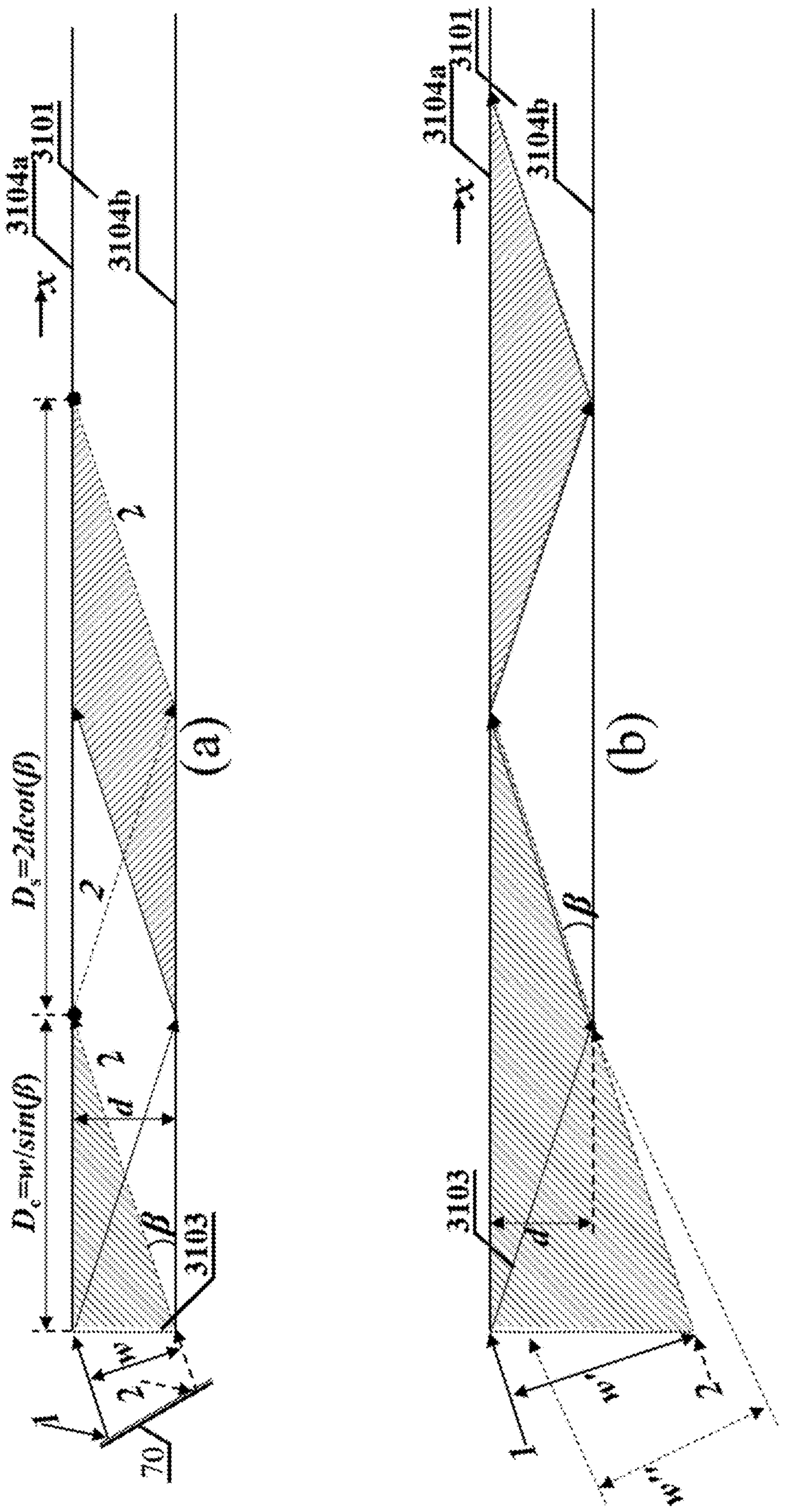
FIG. 8 shows the propagation of obliquely incident parallel beams in a wave-guide.
Figure 9:
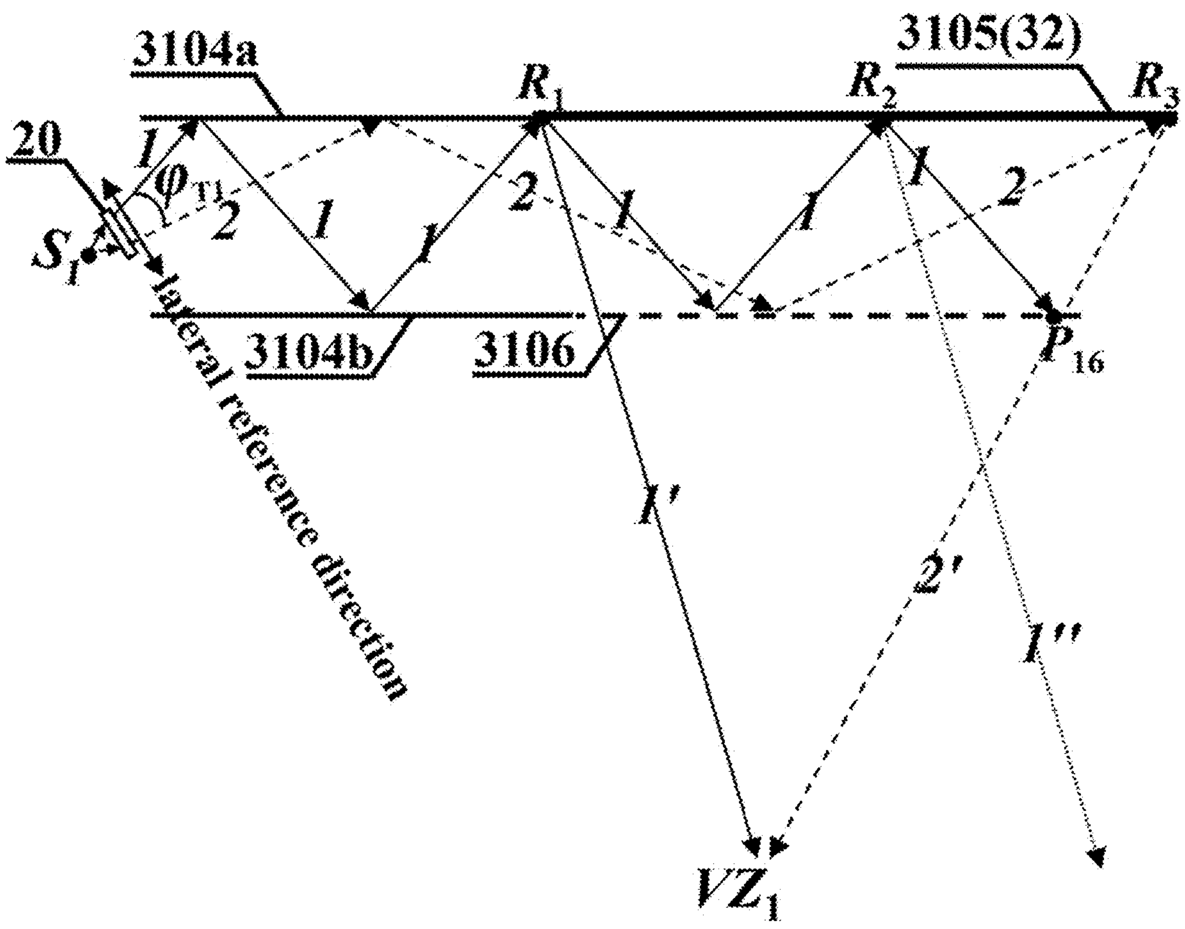
FIG. 9 shows the propagation of obliquely incident divergent beams in the wave-guide.

Relative to FIG. 8, FIG. 9 shows a bundle of beams which incident onto the wave-guide with a non-zero divergence angle $\varphi_{T1}$≤10° in a plane containing a line along the lateral reference direction. Among them, beam 1 and beam 2 are reflected with different number of times by the reflective surfaces 3104*a* and 3104*b*, due to their non-zero included angle. When coupled-out beam 1' from the incident beam 1 and coupled-out beam 2' from the incident beam 2 are guided to the viewing zone $VZ_1$ by the coupling-out element 3105, a second coupled-out beam 1" from the incident marginal beam 1 is also coupled out by the coupling-out element 3105. Under this condition, the coupled out beams 1' and 1" are from a same incident beam 1, so they will carry same message. But they exit the coupling-out element 3105 along different transmission directions. This will make "corresponding optical data of a beam being the projection information of a displayed 3D scene along the transmission direction when the beam reaches into corresponding viewing zone" unenforceable, because a beam corresponds to more than one transmission directions. Under this condition, the display module should be designed to ensure that at most only one of the coupled-out beams (no matter which one it is) from a same incident beam can be received by the viewer, with "corresponding optical data of a beam being the projection information of a displayed 3D scene along the transmission direction when the beam reaches into a pupil of the viewer". Actually, pupil dilatation is unnecessary, or even unwanted by the wave-guide of the present invention. In FIG. 9, the converging element 32 is integrated within the coupling-out element 3105. Obviously, the converging element 32 can also stand alone. The converging element 32 may be a lens, or a zoom lens with a controllable focus, for example a liquid crystal lens with changeable focal length under the driving of the controller 40, or a compound liquid crystal lens stacked by more than one liquid crystal plates. For the last one, different combinations of the liquid crystal plates under the driving of the controller 40 present different focal lengths.

In FIG. 7, a reflective surface is taken as the coupling-in device 3103 of the optical wave-guide 31. Actually, all kinds of existing optical wave-guide structures can be taken as the optical wave-guide 31 of present invention, such as a hollow cavity-type optical wave-guide structure, or optical wave-guide structures with different kinds of coupling-in structures or/and different kinds of coupling-out structures. For example, the coupling-out element 3105 can be a metasurface structure, or a holographic grating structure, or a relief grating structure.

Figure 10:
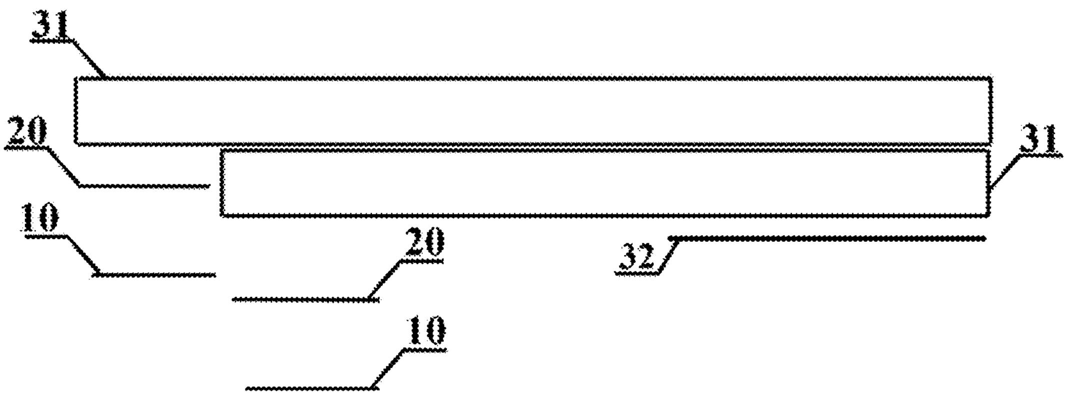
FIG. 10 is an example of the combiner stack consisting of two wave-guides.

A combiner stack 90 that includes at least two combiners can be employed in the proposed display module, such as the exampled two wave-guides 31 in FIG. 10. They can share a same converging element 32. Obviously, a corresponding converging element 32 can also be integrated within each layer of wave-guides 31. A light engine 10 and a divergence-angle modulating element 20 are assigned to each layer of wave-guides 31. The wave-guides 31 also can share a common light engine 10 or/and a common divergence-angle modulating element 20. Different combiners 30 of a combiner stack 90 can serve for beams of different wavelengths, for example three wave-guides of a combiner stack 90 correspond to R (Red) light, G (Green) light and B (Blue) light, respectively. Different combiners 30 of a combiner stack 90 also can serve for beams of different characteristics, such as different linearly polarized beams or different circularly polarized beams. Beams from the projection points should be endowed with such different characteristics correspondingly.

In the display module, the converging element 32 also can be a zoom lens with a controllable focus, which projects virtual images of the projection points to different depths in a time sequence driven by the control device 40.

Embodiment 3

Figure 11:
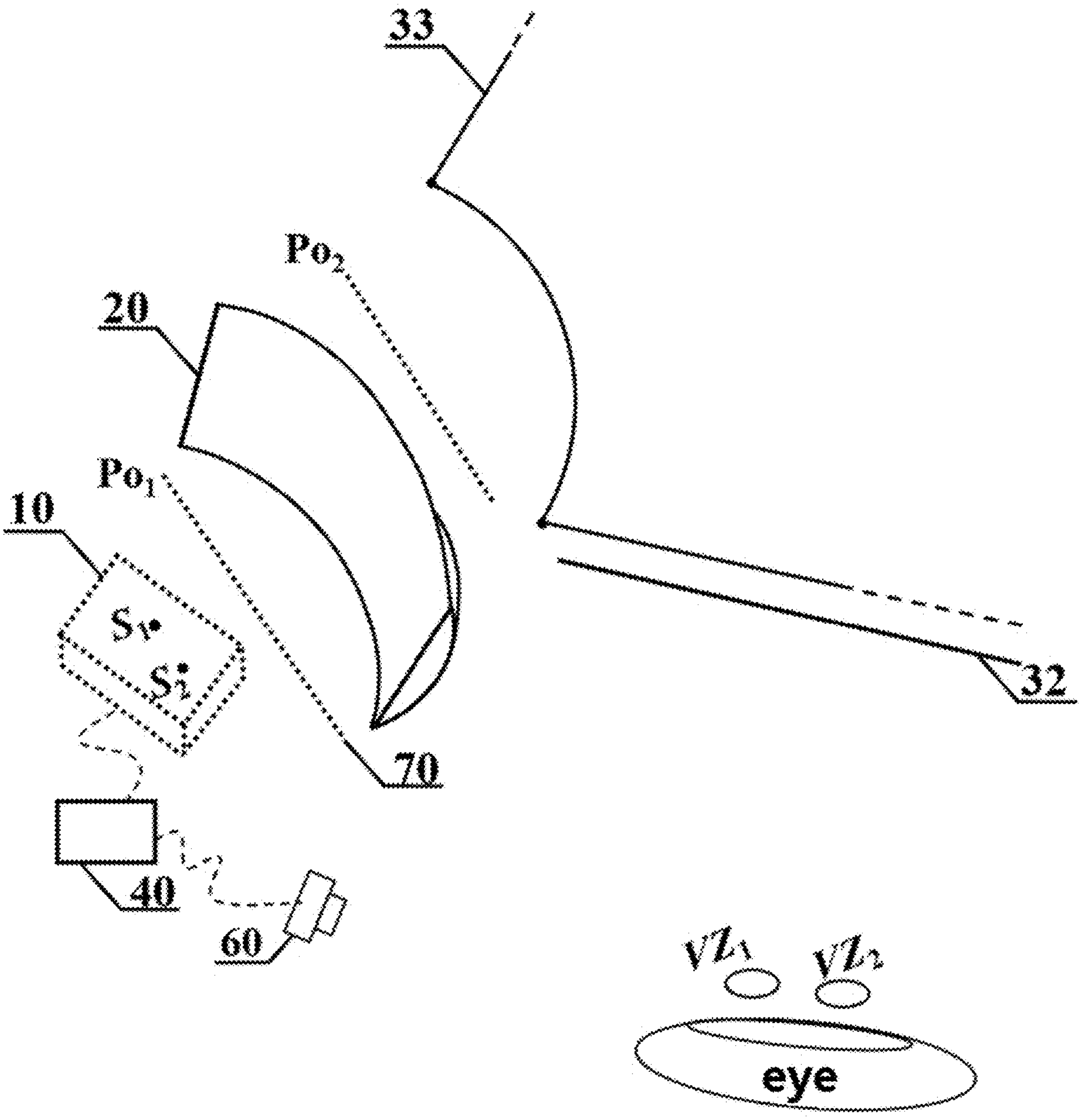
FIG. 11 shows a display module with a direction modulating element.

FIG. 11 takes the combination of a direction modulating element 33 and a converging element 32 as a combiner 30. The beams from a projection point are converted into a bundle of beams with an asymmetrical divergence angle. This bundle of beams has a divergence angle ≤10° along a lateral reference direction, and has a divergence angle >10° along a vertical reference line. The premise of the lateral reference direction setting is to guarantee that, the beams in a plane containing a line along the lateral reference direction obliquely incident onto the direction modulating element 33, to cover an enlarged region relative to the section size w of these beams. In general, the beams from the light engine 10 are projected from side position of the viewer along a line connecting two eyes of the viewer, especially when two proposed display modules are attached to two eyes of the viewer in a head-mounted display, similar to the case shown in FIG. 7. The beams are incident obliquely onto the direction modulating element 33 along the arrangement direction of the viewer's two eyes. Under this condition, a line along the lateral reference direction is preferred to be set coplanar with a line along the arrangement direction of the viewer's two eyes. Obviously, when the beams from a projection point are obliquely incident onto the direction modulating element 33 along another direction, a line along the lateral reference direction is preferred to be set coplanar with a line along this another direction. The vertical reference line is often preferred to be set perpendicular to the lateral reference direction. The direction modulating element 33 modulates beams from a projection point and guides them to the converging element 32. Then, the converging element 32 converges the beams from a projection point to corresponding viewing zone. The direction modulating element 33 is a reflecting surface or a transmissive surface with a metasurface structure, or with a holographic grating structure, or with a relief grating structure, and so on. Frequently, the direction modulating element 33 transforms the incident beams from a projection point to a bundle of parallel beams. The converging element 32 can also be integrated within the direction modulation element 33. The combiner 30 can further comprise a compensation unit 3107, placed between the direction modulating element 33 and the external environment, for eliminating the impact of the direction modulating element 33 and/or converging element 32 on the light from the external environment for an AR display. When the converging element 32 is integrated within the direction modulating element 33 and the direction modulating element 33 has no impact on the light from the external environment, a compensation unit 3107 is not needed for an AR display.

Figure 12:
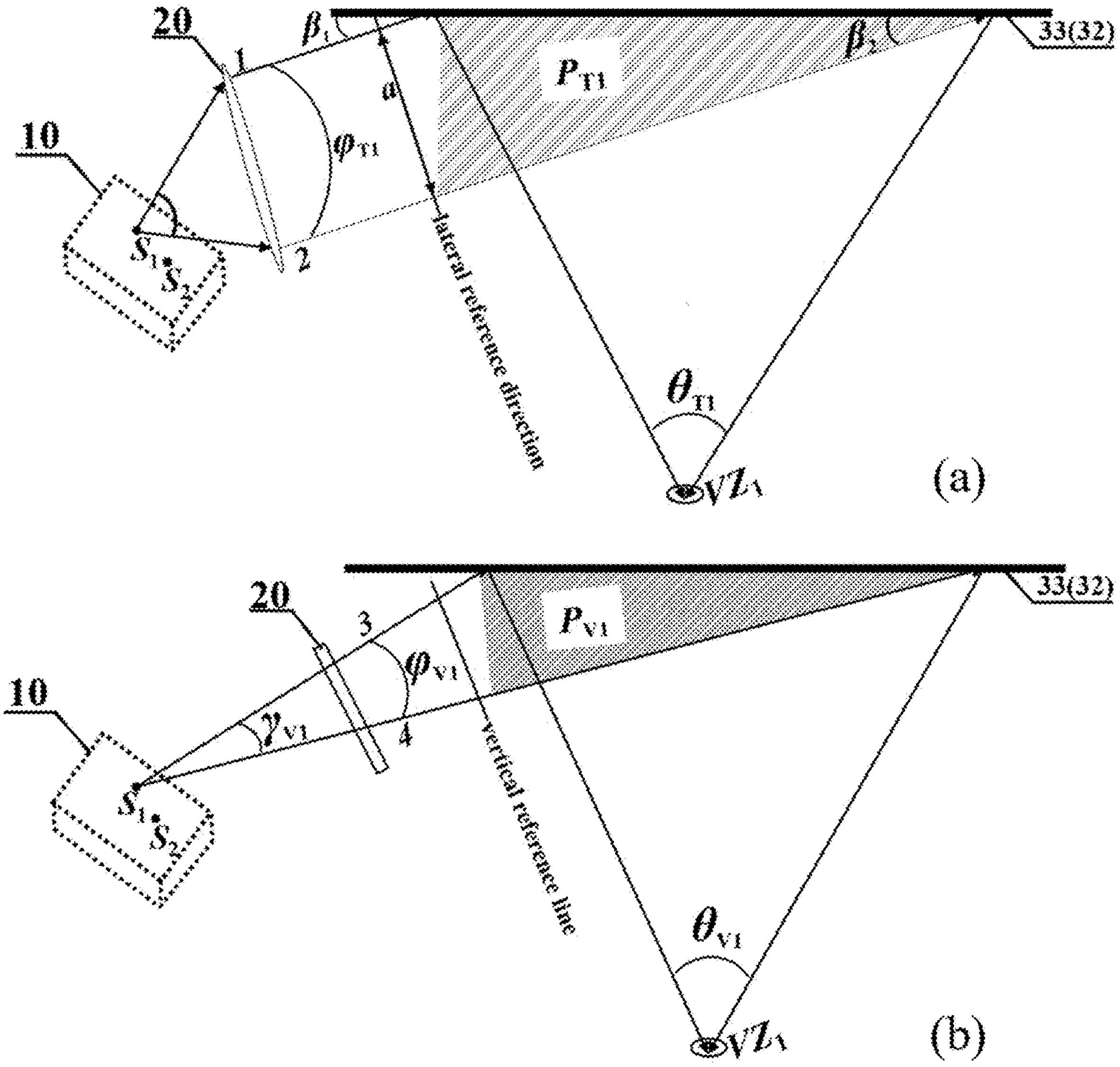
FIG. 12 shows another display module with a direction modulating element.

Concretely, (a) of FIG. 12 shows the beams from a projection point $S_1$ with a divergence angle 0° in a plane $P_{T1}$, which contains a line along the lateral reference direction and the projection point $S_1$. That is to say, the beams from the projection point $S_1$ are parallel in the plane $P_{T1}$, with an equivalent oblique angle $\beta_1=\beta_2=\beta$ to the direction modulating element 33. Under this condition, these beams cover a region $D_c=w/\sin(\beta)$ on the direction modulating element 33. "w" is the section size of these beams. $\beta_1$ and $\beta_2$ are the oblique angles of the marginal beams 1 and 2, to the direction modulating element 33, respectively. Obviously, with a smaller β, a larger $D_c$ will bring a larger FOV, such as the FOV of $\theta_{T1}$ shown in FIG. 1. In the plane $P_{V1}$ containing the vertical reference line and the projection point $S_1$, a large divergence angle (>10°) of the beams from the projection point $S_1$ results in a large FOV $\theta_{V1}$ along another direction. The vertical reference line is often set perpendicular to the lateral reference direction. In FIG. 12, the converging element 32 is integrated within the direction modulation element 33. Obviously, the converging element 32 can also stand alone, as shown in FIG. 11. The converging element 32 can be a lens, or other optical element, such as a zoom lens with a controllable focus. For example, the zoom lens can be a liquid crystal lens with changeable focal length under the driving of the controller 40, or a compound liquid crystal lens stacked by more than one liquid crystal plates. For the latter, the different combinations of the compound liquid crystal lens under the driving of the controller 40 present different focal lengths.

A combiner stack 90 that includes at least two direction modulating elements 33 also can be employed in the proposed display module. They may share a same converging element 32. Obviously, a corresponding converging element 32 can also be integrated within corresponding direction modulating elements 33. A light engine 10 and a divergence-angle modulating element 20 can be assigned to each direction modulating element 33. The direction modulating elements 32 also can share a common light engine 10 or/and a common divergence-angle modulating element 20. Different direction modulating elements 33 of a combiner stack 90 can serve for beams of different wavelengths, for example three direction modulating elements 33 correspond to R light, G light and B light respectively. Different combiners 30 of a combiner stack 90 also can serve for beams of different characteristics, such as different linearly polarized beams or different circularly polarized beams. Beams from the projection points should be endowed with such different characteristics correspondingly.

Embodiment 4

In the proposed display module, the optical data of a beam is set to be the projection information of the displayed 3D scene along the transmission direction when this beam reaches into corresponding viewing zone. Each beam can carry corresponding optical data under control of the controller 40, when they exit the light engine 10 which has a signal connection with the controller 40.

Figure 13:
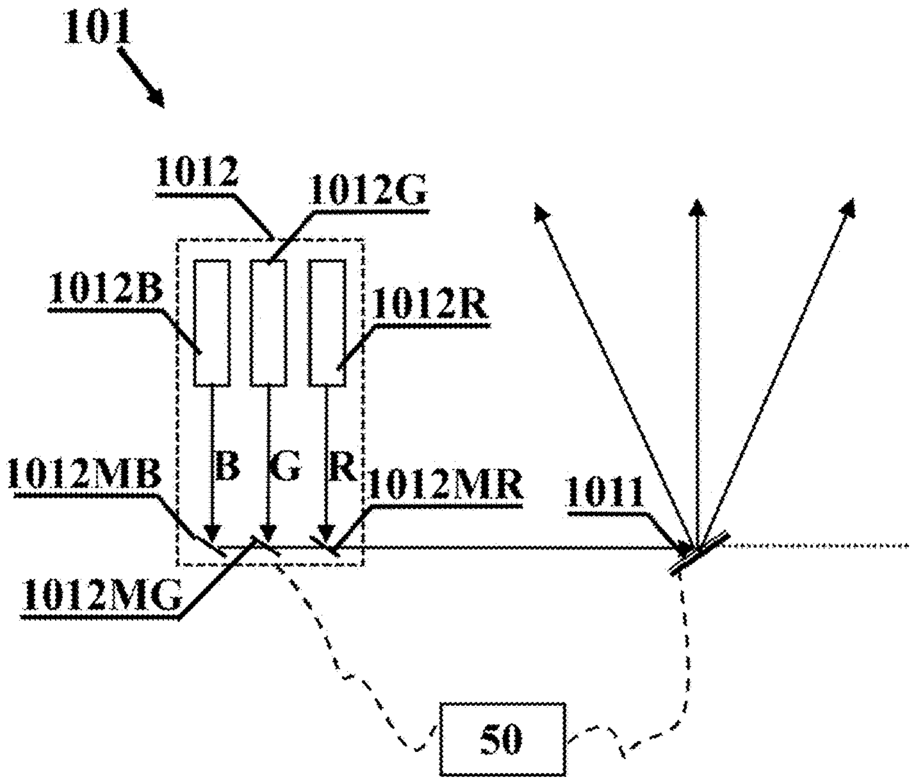
FIG. 13 shows a light engine which projects beams carrying optical data.
Figure 14:
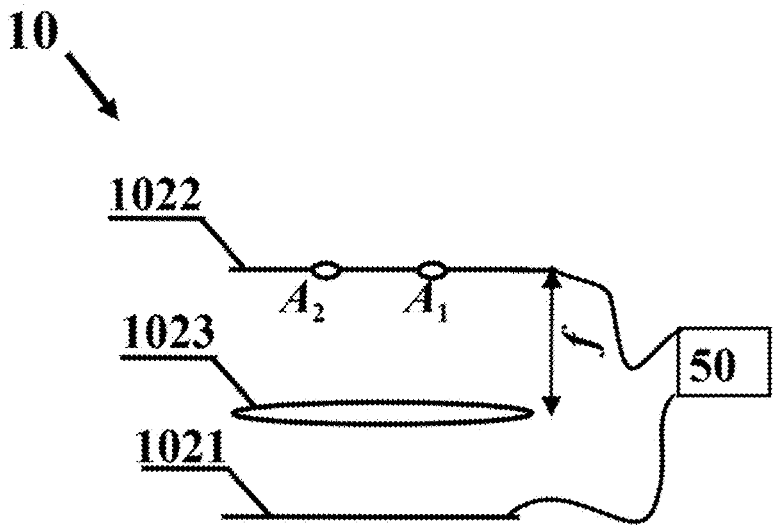
FIG. 14 shows another light engine which projects beams carrying optical data.
Figure 15:
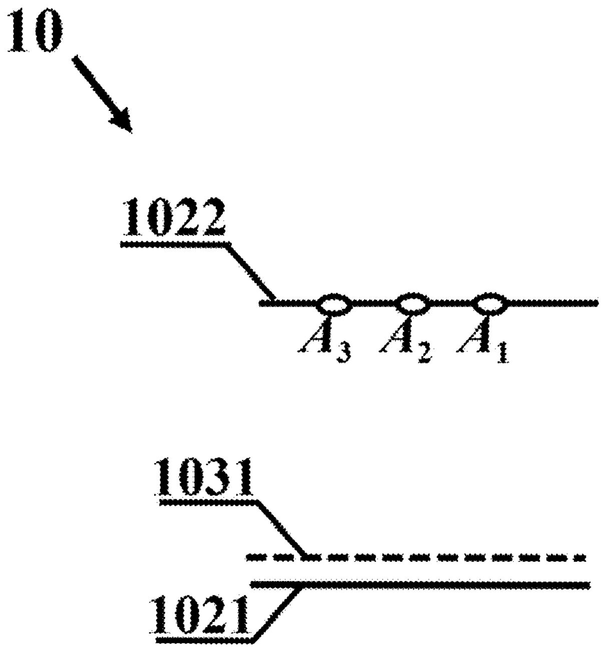
FIG. 15 shows one light engine which projects beams carrying optical data.

FIG. 13 shows an example of the light engine 10, which can emit beams carrying corresponding optical data. The light engine 10 consists of M beam scanning projectors 101. As shown in FIG. 13, a beam scanning projector 101 includes a scanning device 1011 and a modulated-beam generating unit 1012. The modulated-beam generating unit 1012 includes three beam sources 1012R, 1012G, and 1012B, which emit a R (red) beam, a G (green) beam, and a B (blue) beam, respectively. The emitted R beam, G beam and B beam are merged into a compound beam by a mirror 1012MB and two semitransparent mirrors 1012MG and 1012MR. The compound beam incidents onto the scanning device 1011. Then it is reflected along different directions by the scanning device 1011 based on time-multiplexing, under control of the controller 40. So, a scanning device 1011 functions as a projection point, with the emitting beams all being thin beams. The beam emitting from a beam source is refreshed with corresponding optical data under control of the controller 40. The scanning device 1011 shown in FIG. 13 can perform two-dimensional scanning. It can also be replaced by two cascaded one-dimensional scanning devices to achieve two-dimensional scanning FIG. 14 is also an example of the light engine 10. The light engine 10 includes a display panel 1021, an aperture array 1022 consisting of M apertures, and a first auxiliary modulating element 1023 which converges light from the display panel 1021 to the aperture array 1022. The display panel 1021 is composed of pixels or sub-pixels, which can load optical data under control of the controller 40. FIG. 14 takes an aperture array 1022 consisting of M=2 apertures $A_1$ and $A_2$ as example, and the first auxiliary modulating element 1023 takes a lens of focal length f. In FIG. 14, each aperture of the aperture array 1022 is placed on the focal plane of the first auxiliary modulating element 1023. The apertures can also be positioned away from the focal plane, as long as the light from all pixels or sub-pixels can cover all the apertures. In FIG. 13, the apertures $A_1$ and $A_2$ function as the projection point. These apertures are turned on in a sequential manner under the control of the controller 40, with only one aperture turned-on at each time-point. Preferably, the size of the apertures is set small for emitting thin beams. Thin beams are desired by a Super multi-view display or a Maxwellian view display, for a large display depth. This is applicable to the following embodiments. To make the light beams from a projection point to cover a shape one the combiner 30, the pixels or sub-pixels may occupy another shape on the display panel 1021. FIG. 14 is based on time-multiplexing. A second auxiliary modulating element 1031, shown in FIG. 15, can replace the first auxiliary modulating element 1023, for implementing a spatial-multiplexing. The function of the second auxiliary modulating element 1031 is to guide light from different groups of pixels or sub-pixels to corresponding apertures, respectively. For example, the second auxiliary modulating element 1031 consists of micro-nano units. These micro-nano units are assigned to the pixels or sub-pixels of the display panel 1021 by a one-to-one manner, guiding beams from M pixel groups or M sub-pixel groups to the M apertures of the aperture array 1022, respectively.

Figure 16:
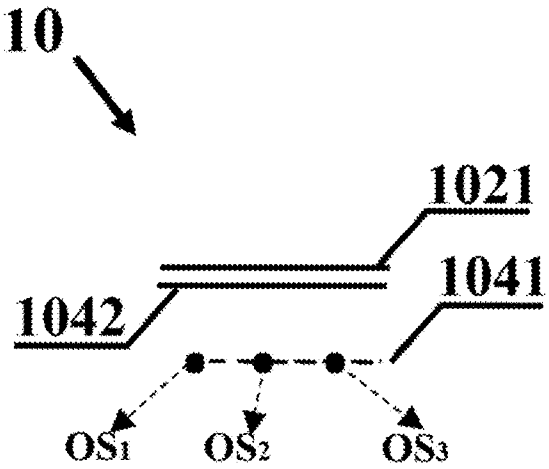
FIG. 16 shows another light engine which projects beams carrying optical data.

Display panel 1021 discussed above can be self-luminous type, or back-lit type with a backlight structure. FIG. 16 shows an example of the light engine 10, with a back-lit type display panel 1021. It also includes a light-source array 1041 consisting of M=3 light-sources $OS_1$, $OS_2$, $OS_3$, and an imaging element 1042. The imaging element 1042 projects the image of the M light-sources, as M projection points. The M light-sources are turned on sequentially under the control of the controller 40. At a time-point, under the control of the controller 40, only one light-source is turned on, with the display panel 1021 refreshed by corresponding perspective view. The positions of the imaging element 1042 and the display panel 1021 can interchange with each other.

Figure 17:
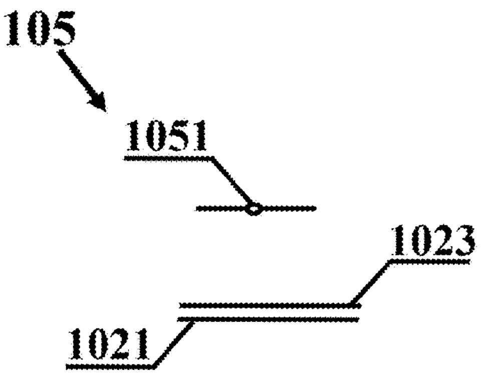
FIG. 17 shows a light engine consisting of projectors.

In FIG. 17, the shown light engine 10 includes M projectors. A projector consists of a display panel 1021, a filter aperture 1051, and a first auxiliary modulating element 1023. The filter apertures 1051 function as the projection apertures.

Furtherly, each aperture of FIG. 14 can be configured to consist of K≥2 sub-apertures. The sub-apertures of an aperture are endowed with different orthogonal characteristics. For example, K=2 sub-apertures of an aperture allow two kinds of linearly polarized light passing through, respectively. Polarization directions of these two kinds of linearly polarized light are perpendicular to each other. Correspondingly, dividing the pixels or sub-pixels of the display panel 1021 into K=2 groups, emitting above two kinds of linearly polarized light, respectively. Thus, K=2 projection points, which are the K=2 sub-apertures of an aperture, get generated at a time-point, corresponding to the K=2 groups of pixels or sub-pixels. Totally, K×M projection points will be generated at M time-points. Said orthogonal characteristics are not limited to the exampled linearly polarization characteristics only. Color characteristics, circularly polarization characteristics, and other similar characteristics, even their combinations, can function as said orthogonal characteristics. Similarly, an aperture in FIG. 15, a filter aperture in FIG. 17, can be replaced by K sub-apertures with different orthogonal characteristics, for generating more projection points through help of the spatial-multiplexing. Even the light-source of FIG. 16 can be replaced by M sub-light-sources with different orthogonal characteristics. Correspondingly, the pixels or sub-pixels of the display panel 1021 are divided into K groups, allowing light of K kinds of orthogonal characteristics passing through or emitting from, respectively.

Embodiment 5

Figure 18:
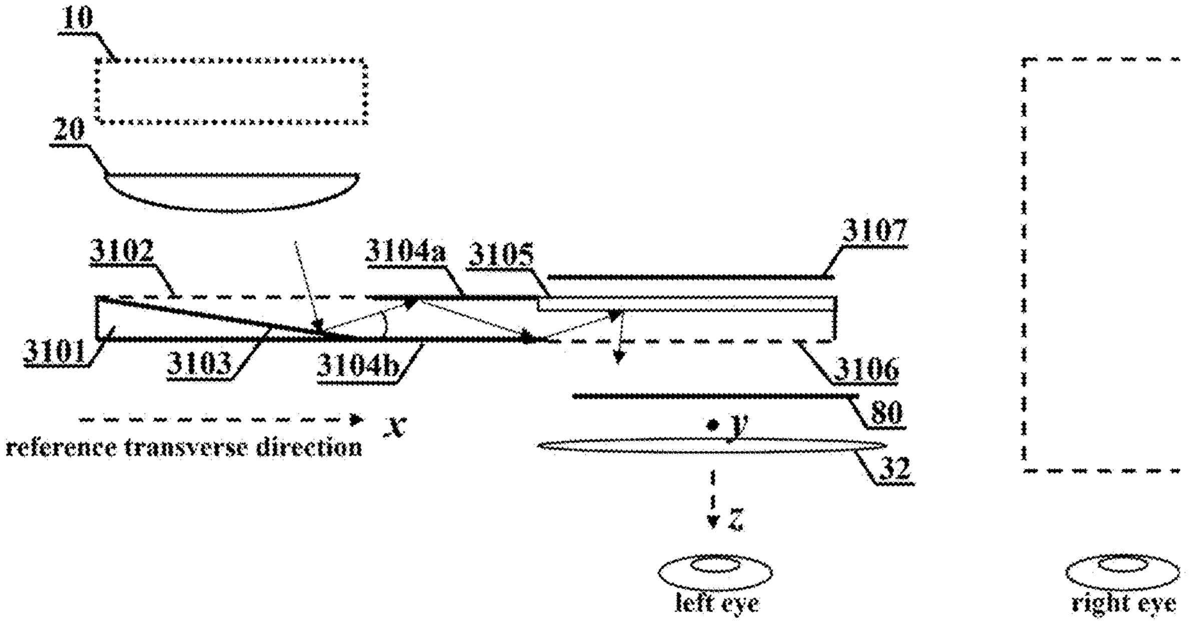
FIG. 18 shows a display module with a backlit display screen.

In above embodiments, the optical data of each beam can be loaded by a backlit display screen 80, which is inserted into the light path of the beams. As shown in FIG. 18, under this condition, the light from a projection point functions as the directional backlight to the backlit display screen 80. Each pixel or sub-pixel of the backlit display screen 80 which has a signal connection with the controller 40. modulates the incident backlight under control of the controller 40, and emits a beam with corresponding optical data. The optical data of a beam is the projection information of a displayed 3D scene along the transmission direction when this beam reaches into corresponding viewing zone. The backlit display screen 80 is set between the wave-guide 31 and converging lens 32. The backlit display screen 80 may be placed at other position along beams from the light engine 10. Other optical structure, for example a combination of a direction modulating element 33 and a converging element 32, may also be taken as a combiner in FIG. 18. Similarly, said converging element 32 can also be integrated into corresponding wave-guide 31, or corresponding direction modulating element 33. When the backlit display screen 80 is positioned between the combiner 30 and the viewing zones, the problem that "adjacent beams with equal angular spacing $\delta\varphi$ will correspond to different spacing between their projection points on the combiner 40" discussed above with reference to FIG. 3 will not appear.

Figure 19:
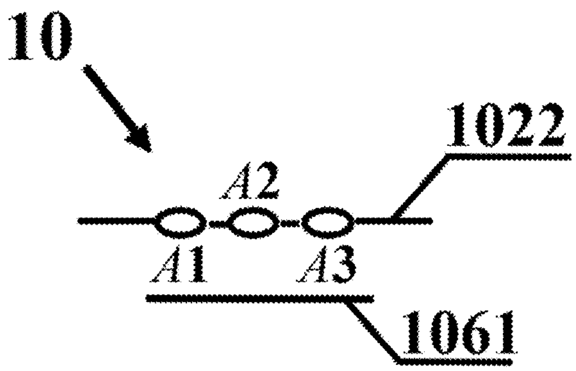
FIG. 19 shows a light engine which projects backlights to a backlit display screen.

FIG. 19 shows an example of the light engine 10 with a backlit display screen 80. The light engine 10 includes a backlight structure 1061 and an aperture array 1022. The backlight structure 1061 provides light to the aperture array 1022. M apertures of the aperture array 1022 are turned on sequentially under control of the controller, with the backlit display screen 80 refreshing by corresponding image synchronously.

Figure 20:
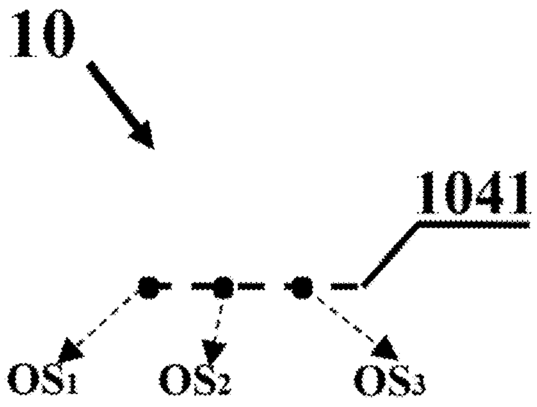
FIG. 20 shows another light engine which projects backlights to a backlit display screen.

As shown in FIG. 20, a light-source array 1041 consisting of M light sources which function as M projection points, can function as the light engine 10. They provide backlight to the backlit display screen 80 in a time sequence. Similar to the embodiment 4, each aperture of FIG. 19 can be replaced by K sub-apertures with different orthogonal characteristics, and each light source of FIG. 20 can be replaced by K light-sources which emit light of corresponding K kinds of orthogonal characteristics, respectively, for generating more viewing zones by spatial-multiplexing. Correspondingly, the pixels or sub-pixels of the backlit display screen 80 are divided into K groups, allowing light of K kinds of orthogonal characteristics passing through or emitting from, respectively.

Obviously, as discussed in the above embodiments, the display module can include more components, such as said deflecting unit 50, or/and said pupil tracking unit 60 et. al.

The core idea of the present invention is projecting a bundle of beams with an asymmetrical divergence angle from each projection point. The bunch of beams from each projection point covers a rather large region on the combiner, by oblique incidence along a direction and by a large divergence angle along another direction. Then, the combiner converges the incident beams from different projection points to corresponding viewing zones, respectively, implementing a Maxwellian view 3D display or a Super multi-view 3D display. The designed beam bundles with an asymmetrical divergence angle make the display module take a thin form factor, under the premise that a wide FOV along two directions is reachable. And a small divergence angle along the oblique incidence direction also guarantees a uniform display resolution.

Above only are preferred embodiments of the present invention, but the design concept of the beam bundles with an asymmetrical divergence angle is not limited to these, and any insubstantial modification made to the present invention using this concept also falls within the protection scope of the present invention. Accordingly, all related embodiments fall within the protection scope of the present invention.

It will be apparent to those skilled in the art that various modifications and variations can be made to the disclosed embodiments without departing from the scope or spirit of the disclosure. For example, various existing optical wave-guide structures can be used as wave-guides of this patent. For example, other optical structures that can project divergent beams from different projection points all can be taken as the light engine of this patent. At the same time, various orthogonal characteristics can also be employed by this patent. In view of the foregoing, it is intended that the disclosure covers modifications and variations provided that they fall within the scope of the following claims and their equivalents.

What is claimed is:

1. A display module based on divergent beams with an asymmetrical divergence angle, comprising:

a controller;

a light engine configured to respectively project divergent beams from M projection points under control of the controller, wherein $M \geq 1$;

a divergence-angle modulating element configured to modulate beams from a projection point, such that beams from the projection point are emit as a bundle of beams with an asymmetrical divergence angle, $\leq 10°$ along a lateral reference direction and $>10°$ along a vertical reference line;

a combiner configured to perceive the beams from the divergence-angle modulating element, with an obliquely incidence of the beams emitted by the projection point along a direction at the divergence angle $\leq 10°$, and converge the beams from the projection point to a corresponding viewing zone.

2. The display module based on divergent beams with the asymmetrical divergence angle of claim 1, wherein the divergence-angle modulating element is a cylindrical lens with a straight axis, or a cylindrical lens with a curved axis, or a combination of a collimating lens and a cylindrical lens, or a plane with micro-nano structure.

3. The display module based on divergent beams with the asymmetrical divergence angle of claim 1, wherein the display module further comprises a deflecting unit locating in a light path of the beams from the projection points, a deflecting unit is used for assisting the combiner to direct beams from the projection point to different viewing zones by deflecting incident beams under control of the controller.

4. The display module based on divergent beams with the asymmetrical divergence angle of claim 1, wherein the display module further comprises a pupil tracking unit which is configured to detect positions of a viewer's pupil(s) real-timely, and the controller activates the projection points based on the detection of pupil tracking unit such that the projection points emit beams that reach to the viewer's pupil(s).

5. The display module based on divergent beams with the asymmetrical divergence angle of claim 3, wherein the display module further comprises a pupil tracking unit which is configured to detect positions of the viewer's pupils real-timely, and only viewing zones around the pupil(s) are generated under the control of the controller.

6. The display module based on divergent beams with the asymmetrical divergence angle of claim 1, wherein the display module further comprises an auxiliary guiding element, for assisting to direct beams from the light engine to the combiner.

7. The display module based on divergent beams with the asymmetrical divergence angle of claim 1, wherein the combiner comprises a wave-guide and a converging element, wherein the wave-guide guides beams from the projection point to the converging element and the converging element converges the beams from the projection point to corresponding viewing zone.

8. The display module based on divergent beams with the asymmetrical divergence angle of claim 7, wherein the wave-guide comprises a wave-guide body, an entrance pupil, a coupling-in element, two reflecting surfaces, a coupling-out element, and an exit pupil;

wherein, passing through the divergence-angle modulating element, beams from a projection point enter the wave-guide body through the entrance pupil; then, guided by the coupling-in element and reflected by the reflecting surfaces, the beams from each projection point propagate in the wave-guide body toward the coupling-out element; the coupling-out element guides the light from each projection point to the converging element through the exit pupil.

9. The display module based on divergent beams with the asymmetrical divergence angle of claim 8, wherein the coupling-out element is a metasurface structure, or a holographic grating structure, or a relief grating structure.

10. The display module based on divergent beams with the asymmetrical divergence angle of claim 8, wherein the wave-guide further comprises a compensation unit placed between the coupling-out element and the external environment, for eliminating an impact of the coupling-out element and/or the converging element on the light from the external environment.

11. The display module based on divergent beams with the asymmetrical divergence angle of claim 7, wherein the converging element is integrated within the wave-guide.

12. The display module based on divergent beams with the asymmetrical divergence angle of claim 8, wherein the converging element is integrated within the coupling-out element.

13. The display module based on divergent beams with the asymmetrical divergence angle of claim 1, wherein the combiner comprises a direction modulating element and a converging element, wherein the direction modulating element modulates beams from the projection point and guides the beams to the converging element, and the converging element converges the beams from the projection point to the corresponding viewing zone.

14. The display module based on divergent beams with the asymmetrical divergence angle of claim 13, wherein the direction modulating element is a reflecting surface with a metasurface structure, or with a holographic grating structure, or with a relief grating structure.

15. The display module based on divergent beams with the asymmetrical divergence angle of claim 13, wherein the combiner further comprises a compensation unit positioned between the direction modulating element and the external environment, for eliminating an impact of the direction modulating element and/or the converging element on the light from the external environment.

16. The display module based on divergent beams with the asymmetrical divergence angle of claim 13, wherein the converging element is integrated within the direction modulating element.

17. The display module based on divergent beams with the asymmetrical divergence angle of claim 1, wherein each beam from a projection point carries corresponding optical data under control of the controller, with the corresponding optical data of a beam being the projection information of a displayed 3D scene along the transmission direction that the beam reaches into corresponding viewing zone.

18. The display module based on divergent beams with the asymmetrical divergence angle of claim 17, wherein the light engine comprises M beam scanning projectors having a signal connection with the controller, wherein, a beam scanning projector comprises a scanning element and a modulated-beam generating unit, wherein, beams from a modulated-beam generating unit are sequentially deflected by the scanning element to generate divergent beams under control of the controller, with the scanning element functioning as a projection point, and the modulated-beam generating unit refreshes each deflected beam synchronously with corresponding optical data under control of the controller.

19. The display module based on divergent beams with the asymmetrical divergence angle of claim 17, wherein the light engine includes a display panel consisting of pixels or sub-pixels for loading optical data under control of the controller, an aperture array consisting of M apertures, and a first auxiliary modulating element guiding light from the display panel to the aperture array, wherein, light from a pixel or a sub-pixel and passing through an aperture functions as a beam, with corresponding optical data refreshed by the pixel or the sub-pixel under control of the controller, and with an aperture as a projection point.

20. The display module based on divergent beams with the asymmetrical divergence angle of claim 17, wherein the light engine comprises an aperture array consisting of M apertures which function as M projection points, and a second auxiliary modulating element consisting of micro-nano units, and a display panel comprising pixels or sub-pixels for loading optical data under control of the controller, wherein, the micro-nano units of the second auxiliary modulating element are assigned to the pixels or sub-pixels of the display panel in a one-to-one manner, guiding beams from M pixel groups or M sub-pixel groups to the M apertures of the aperture array, respectively.

21. The display module based on divergent beams with the asymmetrical divergence angle of claim 17, wherein the light engine comprises a light-source array consisting of M light sources, an imaging element which projects images of the light sources as M projection points, and a display panel comprising pixels or sub-pixels for loading optical data under control of the controller, wherein, the light sources provide backlights to the display panel, and the imaging element projects images of the light sources as M projection points.

22. The display module based on divergent beams with the asymmetrical divergence angle of claim 17, wherein the light engine comprises M projectors, wherein, each projector comprises a display panel, a filter aperture functioning as a projection point, and a first auxiliary modulating element guiding light from the display panel to the filter aperture, and wherein a display panel comprises pixels or sub-pixels for loading optical data under control of the controller.

23. The display module based on divergent beams with the asymmetrical divergence angle of claim 1, wherein a backlit display screen is inserted into the light path of the beams emitting from the light engine, wherein, the backlit display screen comprises pixels or sub-pixels for loading optical data to incident beams from projection points under control of the controller, with the optical data of a beam being the projection information of a displayed 3D scene along the transmission direction that the beam reaches into the corresponding viewing zone.

24. The display module based on divergent beams with the asymmetrical divergence angle of claim 3, wherein a backlit display screen is inserted into the light path of the beams emitting from the light engine, wherein, the backlit display screen comprises pixels or sub-pixels for loading optical data to incident beams from projection points under control of the controller, with the optical data of a beam being the projection information of a displayed 3D scene along the transmission direction that the beam reaches into the corresponding viewing zone.

25. The display module based on divergent beams with the asymmetrical divergence angle of claim 4, wherein a backlit display screen is inserted into the light path of the beams emitting from the light engine, wherein, the backlit display screen comprises pixels or sub-pixels for loading optical data to incident beams from projection points under control of the controller, with the optical data of a beam being the projection information of a displayed 3D scene along the transmission direction that the beam reaches into the corresponding viewing zone.

26. The display module based on divergent beams with the asymmetrical divergence angle of claim 23, wherein the light engine comprises a backlight structure, and an aperture array consisting of M apertures which function as M projection points, wherein, the backlight structure provides backlight to the aperture array under control of the controller.

27. The display module based on divergent beams with the asymmetrical divergence angle of claim 23, wherein the light engine is a light-source array consisting of M light sources which function as M projection points.

28. The display module based on divergent beams with the asymmetrical divergence angle of claim 1, wherein the combiner is replaced by a combiner stack that comprises at least two combiners, with different combiners sharing a same divergence-angle modulation element, or different combiners corresponding to different divergence-angle modulation elements.

29. The display module based on divergent beams with the asymmetrical divergence angle of claim 3, wherein the combiner is replaced by a combiner stack that comprises at least two combiners, with different combiners sharing a same divergence-angle modulation element, or different combiners corresponding to different divergence-angle modulation elements.

30. The display module based on divergent beams with the asymmetrical divergence angle of claim 23, wherein the combiner is replaced by a combiner stack that comprises at least two combiners, with different combiners sharing a same divergence-angle modulation element, or different combiners corresponding to different divergence-angle modulation elements.

31. The display module based on divergent beams with the asymmetrical divergence angle of claim 24, wherein the combiner is replaced by a combiner stack that comprises at least two combiners, with different combiners sharing a same divergence-angle modulation element, or different combiners corresponding to different divergence-angle modulation elements.

* * * * *